(12) United States Patent
Kobayashi

(10) Patent No.: US 9,163,129 B2
(45) Date of Patent: Oct. 20, 2015

(54) BLACK PIGMENT, AND GLAZE AND PAINT CONTAINING SAME

(71) Applicant: KASAI INDUSTRY CO., LTD., Takahama-shi, Aichi (JP)

(72) Inventor: Yuichi Kobayashi, Toyota (JP)

(73) Assignee: Kasai Industry Co., Ltd. (JP)

( * ) Notice: Subject to any disclaimer, the term of this patent is extended or adjusted under 35 U.S.C. 154(b) by 0 days.

(21) Appl. No.: 14/403,959

(22) PCT Filed: May 31, 2013

(86) PCT No.: PCT/JP2013/065188
§ 371 (c)(1),
(2) Date: Nov. 25, 2014

(87) PCT Pub. No.: WO2013/180267
PCT Pub. Date: Dec. 5, 2013

(65) Prior Publication Data
US 2015/0152238 A1     Jun. 4, 2015

(30) Foreign Application Priority Data

Jun. 1, 2012 (JP) .................................. 2012-125692

(51) Int. Cl.
| | |
|---|---|
| C09C 1/00 | (2006.01) |
| C01G 49/00 | (2006.01) |
| C09D 5/32 | (2006.01) |
| C09D 7/12 | (2006.01) |
| C09C 1/24 | (2006.01) |
| C08K 3/22 | (2006.01) |
| C09D 201/00 | (2006.01) |
| C09C 1/34 | (2006.01) |
| C09D 5/33 | (2006.01) |
| C08K 3/20 | (2006.01) |

(52) U.S. Cl.
CPC . *C08K 3/22* (2013.01); *C01G 49/00* (2013.01); *C09C 1/00* (2013.01); *C09C 1/24* (2013.01); *C09C 1/34* (2013.01); *C09D 5/004* (2013.01); *C09D 7/12* (2013.01); *C09D 7/1216* (2013.01); *C09D 201/00* (2013.01); *C01P 2002/50* (2013.01); *C01P 2002/54* (2013.01); *C01P 2002/82* (2013.01); *C01P 2002/84* (2013.01); *C01P 2006/62* (2013.01); *C08K 3/20* (2013.01); *C08K 2003/2234* (2013.01); *C08K 2003/2251* (2013.01); *C08K 2003/2272* (2013.01)

(58) Field of Classification Search
CPC .............. C09C 1/00; C09C 1/22; C09C 1/24; C09C 1/34; C09D 5/32; C09D 7/12; C01G 49/00; C01G 37/00
USPC .......................................... 106/453; 456/456
See application file for complete search history.

(56) References Cited

U.S. PATENT DOCUMENTS

| | | | |
|---|---|---|---|
| 6,174,360 B1 | 1/2001 | Sliwinski et al. | |
| 6,235,106 B1 * | 5/2001 | Loucka et al. | 106/453 |
| 6,454,848 B2 * | 9/2002 | Sliwinski et al. | 106/459 |
| 6,579,356 B2 * | 6/2003 | Loucka et al. | 106/453 |

FOREIGN PATENT DOCUMENTS

| | | |
|---|---|---|
| JP | 2011-184278 A | 9/2011 |
| WO | 2011/103399 | 8/2011 |

OTHER PUBLICATIONS

International Search Report for PCT/JP2013/065188, with English Translation, (Aug. 2013).
Written Opinion for PCT/JP2013/065188, with English Translation, (Aug. 2013).
Tamura, M., Latest Developments on the High Solar Reflectance Paint (Heat-Resistant Paint) and Its Evaluation; Industrial Materials, May 2012, vol. 60, No. 5, pp. 18-22.
Araki, H. et al., Visible Light and Near Infrared Reflectance Characteristics of (Fe, Cr) 2O3 Based Solid Solutions, Proceedings of Academic Research Society in 2011 in Tokai Branch of the Ceramic Society of Japan, p. 38.
Escardino, A., et al., Kinetic study of black (Fe, Cr)2O3 pigment synthesis reaction: influence of composition and particle size, British Ceramic Transactions, 2003, vol. 102, No. 6, pp. 251-256.

* cited by examiner

*Primary Examiner* — Anthony J Green
(74) *Attorney, Agent, or Firm* — Quarles & Brady LLP; Gavin J. Milczarek-Desai

(57) ABSTRACT

Provided is a novel pigment that has the ability to selectively reflect infrared light. The pigment is a black pigment which comprises a $(Cr,Fe)_2O_3$ solid solution, wherein the ratio of the Cr and the Fe (molar ratio) is (90-97):(10-3), the solid solution having a non-spinel structure.

3 Claims, 7 Drawing Sheets

Relation between lightness (L* value) and solar reflectance (%) in near-infrared light wavelength region
(Source: graph according to examinations made by Japan Paint Manufacturers Association in 2008); and the symbol "—" means a standard for high-solar-reflectance paints in the draft for product JIS standards.

BLACK PIGMENT, AND GLAZE AND PAINT CONTAINING SAME

TECHNICAL FIELD

The present invention provides improvement on the solar reflectivity of a black pigment, and more specifically a black pigment comprising a $(Cr,Fe)_2O_3$ solid solution.

BACKGROUND ART

Due to their poor solar light reflectivity, conventional black pigments used on the surface of architectural materials and the like raise temperatures of those architectural materials.

Hence, there have been made researches on a pigment (heat-reflective pigment) which can selectively reflect so-called heat rays (infrared light) while maintaining black color by suppressing the reflectance of visible light.

The present applicant proposes, in Patent Document 1, that a spinel-type crystalline structure affects selective reflectivity of infrared light, and that a non-spinel type crystalline structure improves to better reflect infrared light selectively.

Patent Document 2 proposes a non-spinel type (hematite type) pigment comprising $Cr_2O_3$ and $Fe_2O_3$ as main components. This pigment has high degree of selective reflectivity in the mid-infrared ray (wavelength: 2500 nm).

See also Non-Patent Document 1, concerning the selective infrared light reflectivity (hereinafter sometimes referred to merely as "infrared reflectivity") of conventional pigments. Non-Patent Document 1 provides a figure showing the characteristics of high-solar-reflectance paints (see FIG. 1 attached to this application), and this document which is relevant to the characteristics of high-solar-reflectance paints is referred to herein by reference.

The present inventor has announced excellent infrared reflectance performance of a black pigment comprising a $(Cr,Fe)_2O_3$ solid solution, more specifically a black pigment comprising Cr and Fe at a ratio (molar ratio) of (80:20) and forming a non-spinel structure.

The characteristics of the black pigment is shown as Comparative Example 2 in FIG. 2.

FIG. 1 shows the light reflectance characteristics of both high solar reflectance paints and generic paints in relation to the lightness. In general, the lightness degree of 30 or less exhibits a black color.

PRIOR ART DOCUMENTS

Patent Documents

Patent Document 1: JP 2011-184278 A
Patent Document 2: U.S. Pat. No. 6,174,360 (Example 16 and FIG. 4) Non-Patent Documents
Non-Patent Document 1: Kogyo Zairyo (Industrial Material), Vol. 60, No. 5, pp. 18-22, FIG. 1
Non-Patent Document 2: Proceedings of Academic Research Society in 2011 in Tokai Branch of the Ceramic Society of Japan, p. 38

SUMMARY OF THE INVENTION

Problem to be Solved by the Invention

The present inventor has made earnest studies to further improve the selective reflectivity on infrared light, namely a solar reflective black pigment. The applicant has adjusted the molar ratio between Cr and Fe in a black pigment comprising a $(Cr,Fe)_2O_3$ solid solution with a non-spinel structure, more specifically, the molar ratio of Cr has been raised.

As a result, it has been found that the Cr ratio reaches a saturated infrared reflectance at about 80 mol %; and that a further higher molar ratio of Cr does not increase infrared reflectance, but also decrease while the Cr ratio is between 80 mol % and 85 mol %.

Means for Solving the Problem

However, as a result of the present inventor's additional studies, it has been elucidated that the infrared light reflectivity improves significantly when the Cr content exceeds 90 mol %.

Hence, the black pigment as defined in the first aspect of the present invention comprising a $(Cr,Fe)_2O_3$ solid solution, has a ratio between Cr and Fe of (90 to 97):(10 to 3) and having a non-spinel structure.

The other aspect of the present invention relates to a pigment having an L* value of 30 or less, the pigment having a ratio between Cr and Fe (molar ratio; the same applies to the entire present specification) of (90 to 97):(10 to 3) and also having a non-spinel structure.

BRIEF DESCRIPTION OF DRAWINGS

FIG. 3 shows the relationship between the compound ratio of Cr and the light reflectance.

MODES FOR CARRYING OUT THE INVENTION

Figure 2:
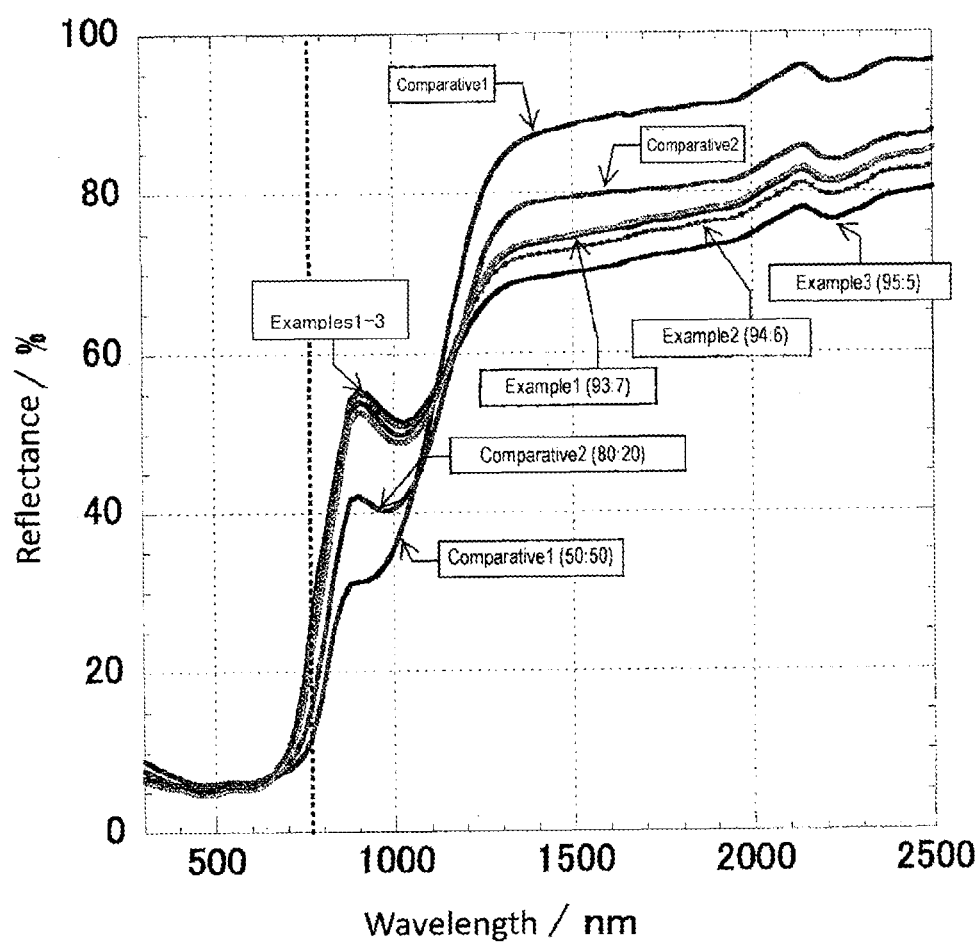
FIG. 2 is a graph exhibiting the relationship between the wavelength and the reflectance in pigments of the Examples and pigments of the Comparative Examples.

FIG. 2 presents the relationship between the wavelength and the reflectance when the Cr/Fe ratio is changed in pigments comprising $(Cr,Fe)_2O_3$ solid solutions. All of the samples have a non-spinel structure.

The Cr/Fe ratio is 50:50 as a Comparative Example (Comparative 1), 80:20 as a Comparative Example 2 (Comparative 2), and 93:7 as an Example 1, 94:6 as an Example 2, and 95:5 as an Example 3.

It can be understood, especially from the results of Examples 1 to 3 in FIG. 2, that, when the Cr/Fe ratio is determined to be (90 to 97):(10 to 3), the resultants reflect infrared light (wavelength: 850 to 1000 nm) very efficiently in an area very close to visible light (namely, having high energy). A more preferable Cr content ratio is a range between 93 mol % and 95 mol %.

Figure 3A:
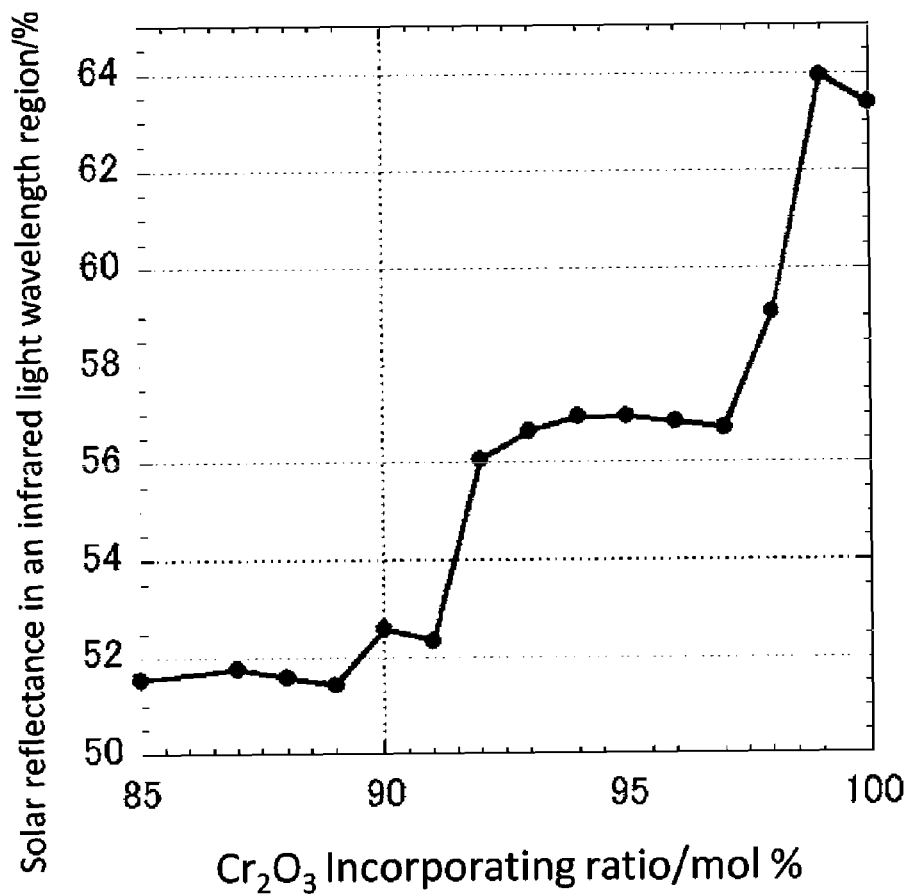
FIG. 3(A) shows the relationship between the combination ratio of Cr and the solar reflectance in an infrared wavelength region.
Figure 3B:
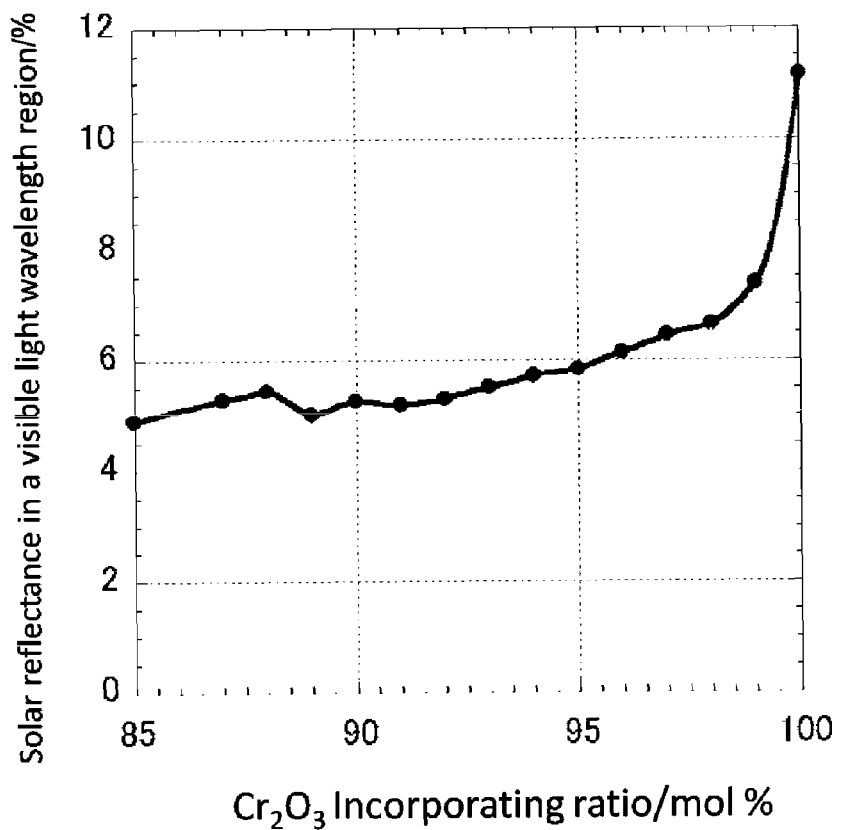
FIG. 3(B) shows the relationship between the blending ratio of Cr and the solar reflectance in a visible ray wavelength region.
Figure 3C:
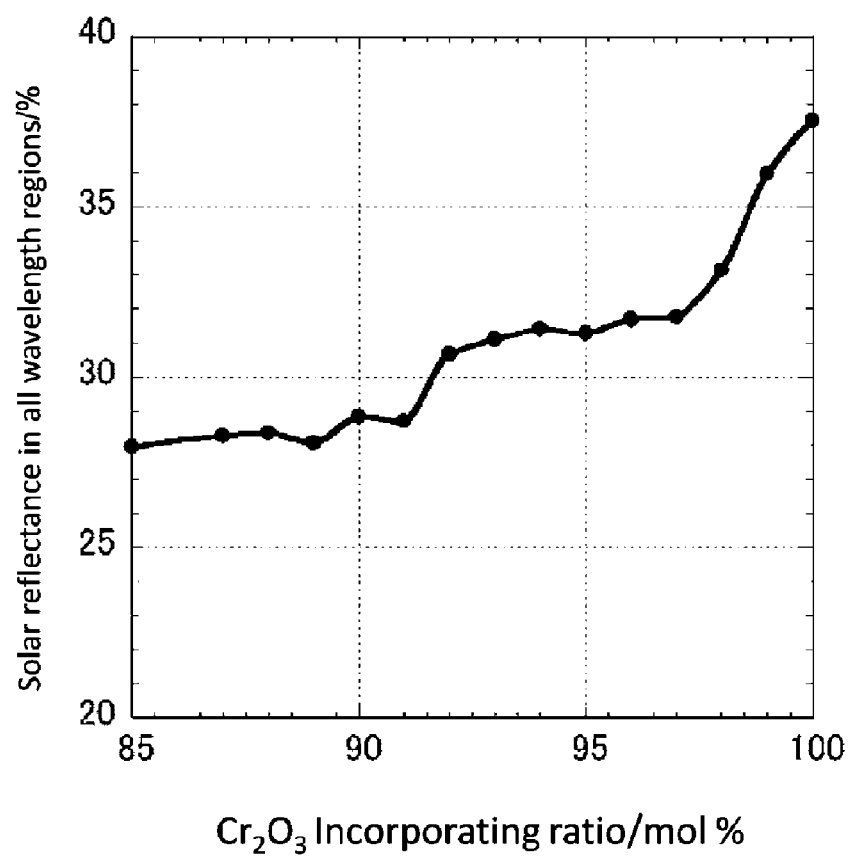
FIG. 3(C) shows the relationship between the composition ratio of Cr and solar reflectance in full spectrum.
Figure 4:
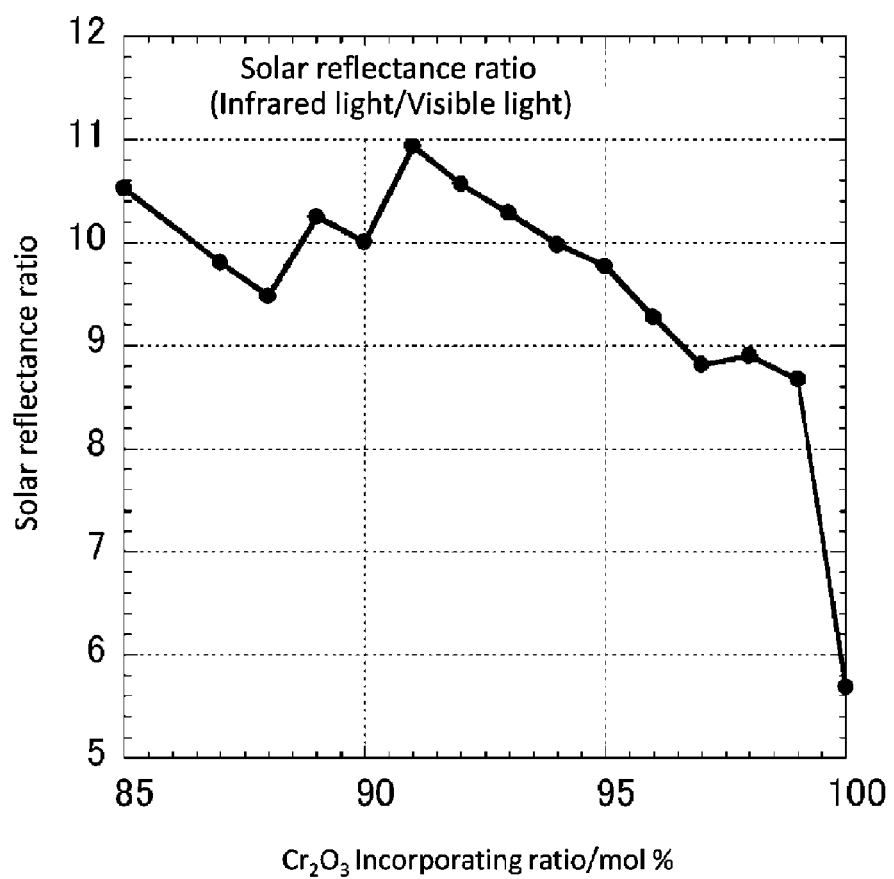
FIG. 4 shows the relationship between the blending ratio of Cr and the reflectance ratio (infrared rays/visible rays).

FIG. 3(A) shows the combination ratio of Cr and the solar reflectance in an infrared light wavelength region; FIG. 3(B) shows the combination ratio of Cr and the solar reflectance in a visible ray wavelength region; and FIG. 3(C) shows the combination ratio of Cr and the solar reflectance in full solar spectrum. FIG. 4 shows the combination ratio of Cr and the reflectance ratio between infrared light and visible light.

From FIG. 3(A), it can be understood that the reflectance in the infrared wavelength region remarkably improves in a range of the Cr content ratio above 90 mol %. With the Cr content beyond 97 mol %, the reflectance in the infrared wavelength region improves further (See FIG. 3(A), whereas the visible light reflectance also increases (See FIG. 3(B), so that a black color cannot be maintained.

Figure 1:
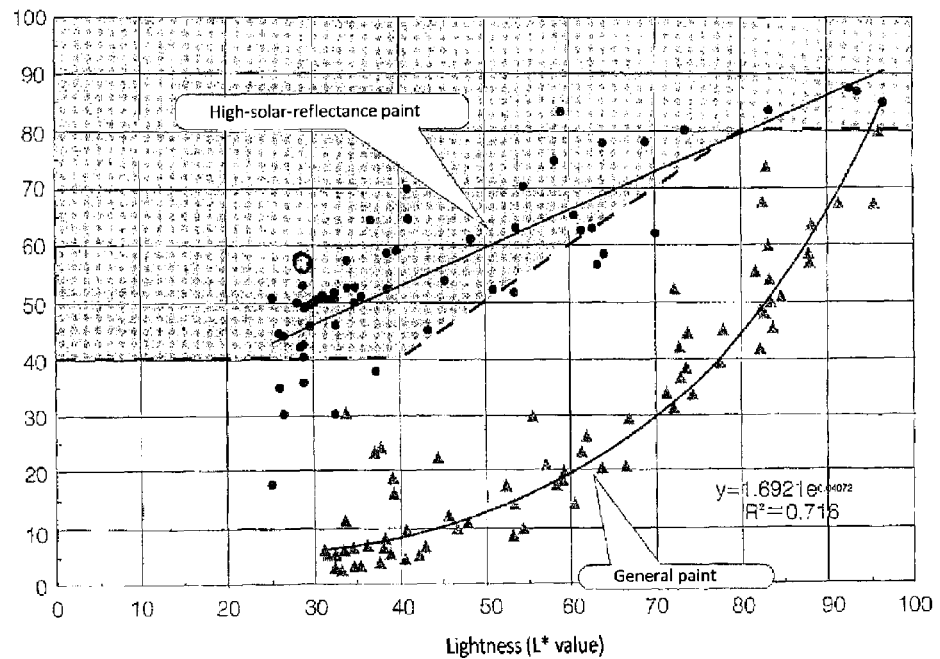
FIG. 1 is a chart showing the relationship between the lightness and the near-infrared light wavelength solar reflectance in paints.

The White circle, "○" in FIG. 1 represents data on Examples 1 to 3 from FIG. 2 when visible light reflectance is converted in terms of the lightness (L*).

Figure 5:
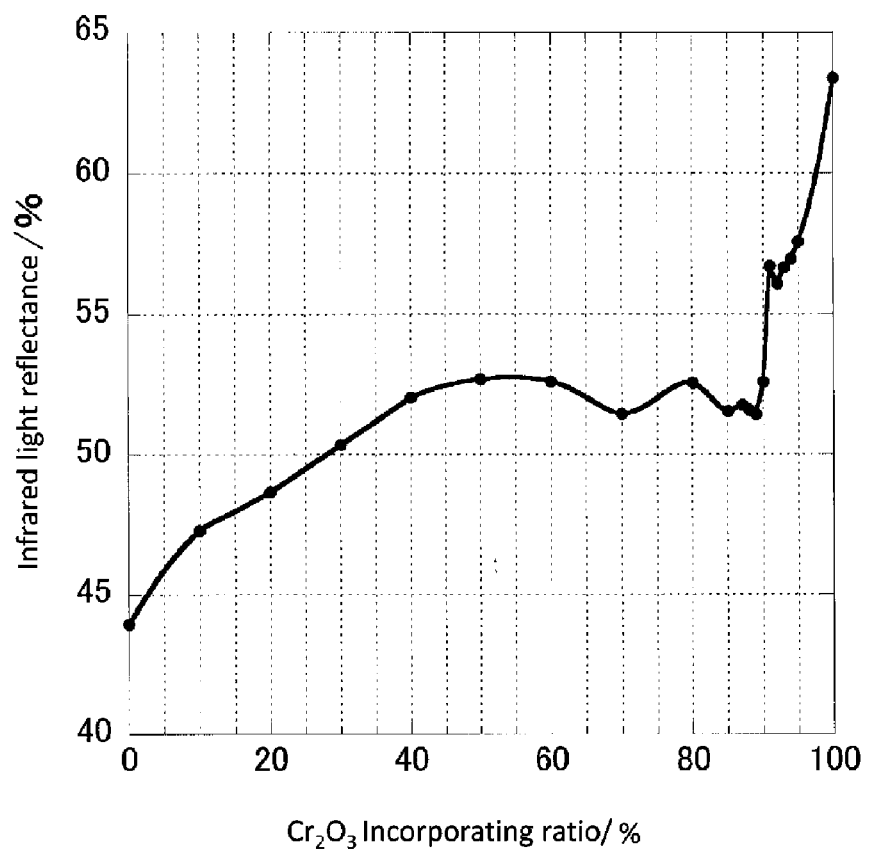
FIG. 5 shows the relationship between the blending proportion of Cr (wide range) and the infrared wavelength reflectance.

From the results shown in FIGS. 2 and 5, it can be understood that the reflectance rate peak near visible light (between 850 nm and 900 nm) contribute to the efficiency of infrared reflectance and that the infrared reflectivity near visible light (wavelength: 850 nm to 900 nm) is saturated when the percentage of Cr content is near 80%. When the content of Cr exceeds 80%, the reflectance peak between 850 nm and 900 nm tends to decrease. Furthermore the infrared reflection efficiency remarkably improves when the Cr content ratio is increased to be above 90%.

EXAMPLES

The $(Cr,Fe)_2O_3$ solid solution used in this invention was obtained by pulverizing and mixing a reagent $Cr_2O_3$ and a reagent $Fe_2O_3$ in predetermined proportions in a wet manner for 24 hours by means of a bead mill. Those mixtures were dry-disintegrated, and then heat-treated at different temperatures ranging from 800° C. to 1400° C. under the air atmosphere. The heat treated samples were again disintegrated. Constituting crystals were examined on the resultants with an X-ray powder diffraction (XRD) system to confirm that the samples had a non-spinel structure (hematite structure).

This X-ray diffraction measurement was carried out in accordance with the method described in Patent Document 1, specifically, using Model RINT2500V/PC manufactured by Rigaku Corporation under the following conditions: target: Cu; voltage: 40 kV; current: 100 mA; and a scan axis: 2θ/θ.

Both the visible light reflectance and infrared light reflectance were measured with a spectrophotometer (Model No. Solidspec-3700 manufactured by Shimadzu Corporation). In detail, a flat sample was produced by pressing the powders together, and the resultant sample and a standard white plate (reflectance: 990; Labsphere®) were irradiated with a halogen lamp to measure the reflected light with the above-described spectrophotometer.

Additional information is that chlorides, nitrates and sulfates of Cr and Fe can be used as starting raw materials. Furthermore, the pigment can be obtained not only from those regents but also from compounds and minerals commonly used for a pigment production.

In FIG. 2, Examples 1 to 3 employ a reagent of $Cr_2O_3$ and a reagent of $Fe_2O_3$ as starting raw materials.

The incorporating ratios shown in FIGS. 2 and 3 are based on the ingredient ratios (molar ratios) between the starting raw materials. The molar ratios of Cr and Fe used in the solid solutions are approximately equal to the mixing molar ratios of the starting raw materials.

In the above-described example, the solid solution can contain any impurities within a range which does not impair black color and also does not suppress the high selective reflectance to infrared light. Such impurities can include aluminum, antimony, bismuth, boron, lithium, magnesium, manganese, molybdenum, neodymium, nickel, niobium, silicon, tin, titanium, vanadium, zinc and cobalt.

The black pigment of the present invention not only can be used in a paint and a glaze, but also can be dispersed in a base material itself for architectural materials and the like by controlling their grain size. Also, the black pigment can also be applied onto the surfaces of automobiles, ships, airplanes, rockets, various industrial instruments and office supplies or dispersed in fibers.

The present invention is not limited to the above-explained embodiment and Example of the invention. Various modified embodiments are also fallen within the present invention within the scope which would be obvious to those skilled in the art without departing from the scope of claims.

The invention claimed is:

1. A black pigment comprising a $(Cr,Fe)_2O_3$ solid solution, the black pigment having an L* value of 30 or less, and a combination ratio (molar ratio) between Cr and Fe of (90 to 97):(10 to 3) and taking a non-spinel structure.

2. A glaze comprising the black pigment as defined in claim 1.

3. A paint comprising the black pigment as defined in claim 1.

* * * * *